US007808861B2

(12) United States Patent
Wien

(10) Patent No.: US 7,808,861 B2
(45) Date of Patent: Oct. 5, 2010

(54) EXPIRATION DATE SYSTEM

(76) Inventor: Abraham Wien, 1450 Brickell Bay Dr., Apt. 707, Miami, FL (US) 33131

(*) Notice: Subject to any disclaimer, the term of this patent is extended or adjusted under 35 U.S.C. 154(b) by 1022 days.

(21) Appl. No.: 11/218,097

(22) Filed: Sep. 1, 2005

(65) Prior Publication Data

US 2005/0286350 A1 Dec. 29, 2005

Related U.S. Application Data

(63) Continuation-in-part of application No. 10/333,093, filed as application No. PCT/US01/22487 on Jul. 17, 2001, now abandoned.

(51) Int. Cl.
*G01D 21/00* (2006.01)

(52) U.S. Cl. ....................................... 368/327; 116/207

(58) Field of Classification Search ................. 368/327; 116/206–207
See application file for complete search history.

(56) References Cited

U.S. PATENT DOCUMENTS

| | | | | |
|---|---|---|---|---|
| 3,954,011 | A | 5/1976 | Manske | |
| 4,169,811 | A * | 10/1979 | Yoshikawa et al. | 436/138 |
| 4,212,153 | A | 7/1980 | Kydonieus et al. | |
| 4,382,700 | A | 5/1983 | Youngren | |
| 4,408,557 | A | 10/1983 | Bradley et al. | |
| 4,511,052 | A | 4/1985 | Klein et al. | |
| 4,903,254 | A | 2/1990 | Haas | |
| 4,938,380 | A | 7/1990 | Donahoe | |
| 5,057,434 | A | 10/1991 | Prusik et al. | |
| 5,058,088 | A | 10/1991 | Haas et al. | |
| 5,107,470 | A | 4/1992 | Pedicano et al. | |
| 5,411,052 | A | 5/1995 | Murray | |
| 5,630,372 | A | 5/1997 | Ramsey et al. | |
| 5,719,828 | A | 2/1998 | Haas et al. | |
| 5,822,280 | A | 10/1998 | Haas | |
| 5,923,407 | A | 7/1999 | Hinton | |
| 6,103,351 | A * | 8/2000 | Ram et al. | 428/195.1 |
| 6,244,208 | B1 | 6/2001 | Qui et al. | |
| 6,254,969 | B1 | 7/2001 | Eberle | |
| 7,280,441 | B2 * | 10/2007 | MacDonald et al. | 368/327 |

FOREIGN PATENT DOCUMENTS

| | | | |
|---|---|---|---|
| JP | 09241570 | A * | 9/1997 |

* cited by examiner

*Primary Examiner*—Vit W Miska
*Assistant Examiner*—Sean Kayes
(74) *Attorney, Agent, or Firm*—Laurence A. Greenberg; Werner H. Stemer; Ralph E. Locher

(57) ABSTRACT

An expiration date system contains a time release mechanism for marking a predetermined interval of time in the range from six months to one year. The mechanism contains a vessel, in which there are brought together in any order a) water, b) a neutralizer, c) a source of oxygen, and d) a hydroquinone compound, such that the pH of the contents of the vessel is greater than 7.0 and the interval being marked begins when the last of items a), b), c) and d) is brought into the presence of the other items and the interval is a function of the pH and of the temperature.

15 Claims, 3 Drawing Sheets

EXPIRATION DATE SYSTEM

CROSS-REFERENCE TO RELATED APPLICATION

This application is a continuation-in-part of copending U.S. application Ser. No. 10/333,093 filed Jun. 12, 2003, which was a national stage application of copending international application No. PCT/US01/22487, filed Jul. 17, 2001, which claimed the benefit of U.S. patent application Ser. No. 09/620,208, filed Jul. 19, 2000, the prior applications are hereby incorporated by reference in its entirety herein.

BACKGROUND OF THE INVENTION

Field of the Invention

The invention relates to a device for marking a predetermined time interval and providing visual evidence for the expiration thereof, and particularly to a new expiration date system (NEDS) which employs a time release mechanism to overcome the problems inherent in expiration date systems used today.

Historically, calendars and clocks have been used to measure time and mark off predetermined intervals. Clocks, including such variants as alarm clocks, metronomes, and stop watches, are mechanisms with a multiplicity of precision crafted moving parts and inevitably too costly to be included with individual items of goods in the channels of retail trade in order to mark off and give visual indication of such intervals as when the end of the useful life of the item is near.

The current conventional method of alerting consumers to the expiration date of perishable items such as pharmaceuticals and food products involves imprinting the expiration date on the actual product or attaching a printed label indicating the expiration date onto the product or its packaging. Consumers are expected to heed the expiration date affixed onto the packaging but very often do not.

Prior expiration date systems have not solved or satisfactorily addressed the problems inherent with expiration date systems intended to alert consumers to the expiration date of the useful life of a perishable product. The current conventional method of alerting consumers to expiration dates is inefficient and unsatisfactory since many consumers fail to take notice of the expiration date indicated on the product or may dispose of the packaging imprinted with the expiration date once the product is unwrapped. Furthermore, the deficiencies inherent in current expiration date systems can potentially cause physical harm to the consumer when the consumer fails to heed the expiration date and uses or consumes a product whose expiration date has passed.

U.S. Pat. No. 6,254,969 discloses a structure for giving a shelf life indication. The structure contains a first layer including an oxygen sensitive ink which gives a visible indication when exposed to a predetermined minimum quantity of oxygen, and a second layer including an oxygen scavenging material adapted to prevent oxygen from reaching the oxygen sensitive ink for a predetermined interval. The oxygen scavenging material has a finite scavenging capability such that after the finite interval the ink reacts with oxygen to give visual indication.

U.S. Pat. No. 6,244,208 discloses a time-temperature integrating indicator device for providing visually observable indication of cumulative thermal exposure, having a barrier material to prevent the lateral flow of viscoelastic indicator material. The device contains a substrate and a backing. The substrate includes a diffusively light reflective porous matrix. The backing includes on its surface a viscoelastic indicator material for contacting the porous matrix and a barrier material for inhibiting the lateral flow of the viscoelastic indicator material between the substrate and the backing. In its activated state, the viscoelastic indicator material migrates into the porous matrix at a rate that increases with increasing temperature and thereby creates a visually observable indication of cumulative thermal exposure.

U.S. Pat. No. 5,923,407 discloses a technique for activating and deactivating the availability of image borders as a function of time. According to one aspect of such technique there is provided a method for use with a digital image editing system that combines an input image with a border selected from a storage medium of borders if the current date is within the design border's availability date.

U.S. Pat. No. 5,057,434 discloses a system of two different indicator technologies, an integrating indicator and a threshold indicator, to give a single output. The first indicator acts independently. The second may contain a separate layer or be mixed with the first, and held inactive until the predetermined "release" temperature at which time the composition is permitted to contact and influence the color change that has occurred in the observed layer as a consequence to environmental temperature change.

U.S. Pat. No. 4,938,380 discloses a method of warning a prospective purchaser of perishable goods with information pertaining to one or more predetermined detrimental factor or factors such as the passage of time. One feature of the method is to protect retail customers from unwittingly purchasing perishable items that may have undergone one of the predetermined detrimental factors. The method of U.S. Pat. No. 4,938,380 includes use in conjunction with an optical scanning device whereby one or more of the factors may be read by a customer or by a scanning machine at the time of checkout.

U.S. Pat. No. 5,411,052 discloses a tamper-evident strip of sealing material, which is adhesively attached around the periphery of a cap or stopper, thereby sealing the cap or stopper to the body of the container. The seal is combined with a chemical indicator of the type that undergoes a marked change in color or form when exposed either to oxygen or water vapor, in the proportion normally present in the ambient atmosphere.

Neither of these patents addresses the problems encountered by consumers of perishable products and instead are geared toward industrial or retail use. Further, these inventions require sophisticated equipment not commonly found among consumers. In addition, the conventional expiration system currently in use fails to account for double expiration dates since customers seldom record the date when they open a sealed product. By double expiration date, we mean that the first expiration date is the expiration date of the unopened product sitting on the shelf, also sometimes referred to as "shelf-life", the second expiration date being the life of the product once opened by the consumer. Conventional expiration date systems are further deficient since they fail to take into account certain external factors which may accelerate or prolong the expiration date of certain products, e.g., heat, light, refrigeration, exposure to atmosphere, etc.

SUMMARY OF THE INVENTION

It is accordingly an object of the invention to provide an expiration date system which overcomes the above-mentioned disadvantages of the prior art devices of this general type. The expiration date system of the invention eliminates the above-identified problems by actively and efficiently alerting the consumer to the expiration date of the designated perishable product which are typically dependent on such factors as time and temperature. Accordingly, there is a need for a system that efficiently alerts the consumer to the end of the useful life of a perishable product based upon the passage of time as well as environmental factors such as temperature, light, and exposure to atmosphere.

The invention relates to expiration date systems in general, and particularly to a new expiration date system (NEDS) which employs a time release mechanism to overcome the problems inherent in expiration date systems used today. The expiration date system of the invention alerts consumers to the expiration date of perishable products such as foods and pharmaceuticals by a time release chemical indicator and may be adapted for a specific use such as a double expiration date or may take into account specific conditions effecting the useful life span of a particular product, e.g., temperature, heat, light, etc.

It is accordingly an object of the invention to provide a time release mechanism that overcomes the above-mentioned disadvantages of the prior art and affords both the capability to mark off a predetermined interval and also provide a visual signal at the end of such interval.

With the foregoing and other objects in view there is provided, in accordance with the invention, a time release mechanism for marking a predetermined interval of time in the range from a few days to two years, preferably from two days to one month and from one month to one year. The time release mechanism contains a vessel, in which there are brought together in any order a) water, b) a neutralizer, c) a source of oxygen, and d) a hydroquinone compound, such that the pH of the contents of the vessel is greater than 7.0 and the interval being marked begins when the last of items a) b) c) and d) is brought into the presence of the other items, wherein the interval is principally a function of the pH and of the temperature.

Other features which are considered as characteristic for the invention are set forth in the appended claims.

Although the invention is illustrated and described herein as embodied in an expiration date system, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF PREFERRED EMBODIMENTS

Figure 1A:
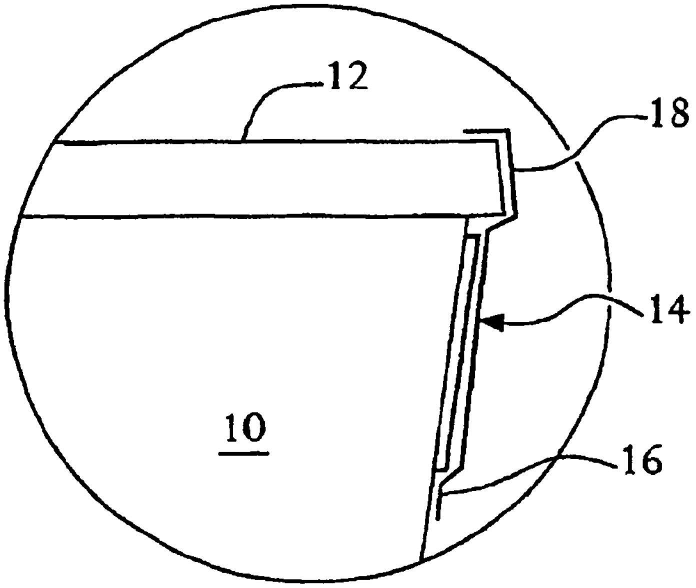
FIG. 1A is a detailed view of detail IA shown in FIG. 1 of the expiration date system.
Figure 1:
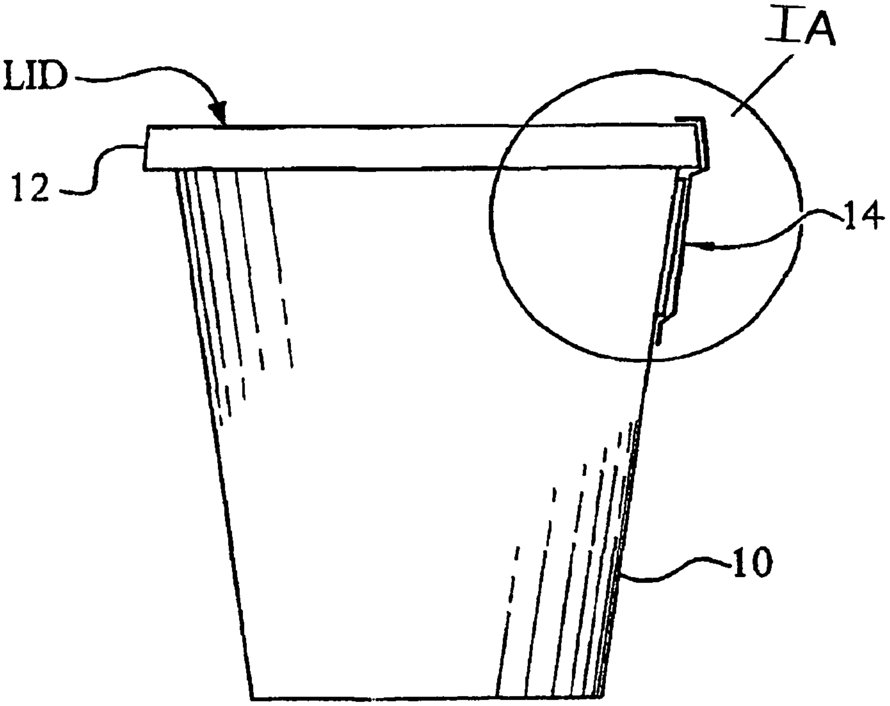
FIG. 1 is a diagrammatic, side-elevational view of a container equipped with an expiration date system according to the invention.

Referring now to the figures of the drawing in detail and first, particularly, to FIG. 1 thereof, there is shown a typical container 10 having a conventional lid 12 which seals the container from external factors and from spilling the container contents may be used to hold a wide variety of non-illustrated perishable products.

An expiration date system 14 in accordance with the present invention, may be utilized to show the expiration date of the product contained in container 10. As shown in the detailed view of FIG. 1A, the expiration date system 14, may be adhesively secured in accordance with conventional methods at its lower end 16 to the side of the container 10. The upper portion 18 of the expiration date system 14 may be fixedly secured in accordance with conventional methods to the lid 12. Thus, when a consumer opens the product contained in the container 10 by removing the lid 2, the system 14 of the present invention is activated when the seal is broken.

Figure 3:
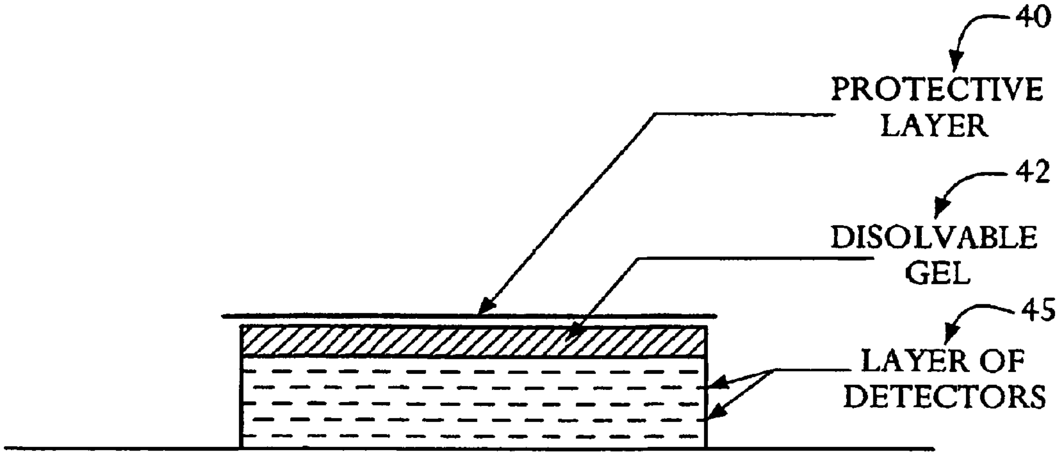
FIG. 3 is a diagrammatic, side sectional view of a second embodiment of the expiration date system.

Alternatively, in the “Self-Contained New Expiration Date System (SCNEDS)” embodiment as shown in FIG. 3, the consumer peels away an outer protective layer 40 of the system, to activate the chemical components of system 45, in accordance with the present invention, to begin measuring the period of expiration for the particular product contained in the container 10.

As will be described in further detail below, the present invention includes two types of systems. One system in accordance with the present invention is a “Self-Contained New Expiration Date System (SCNEDS)” and does not rely upon exposure of the product and/or container to outside elements to indicate product expiration. This type of system is usually used by the manufacturer to provide an indicator of the shelf-life of the product.

The second system in accordance with the present invention is sensitive to environmental and other factors such as external temperature, time, etc. and may also be activated by the consumer once the product packaging is opened, e.g., a container of milk, etc.

In the time release mechanism of the invention, the vessel is selected with a view to minimizing the amount of space and the quantity of materials required to operate the device. The vessel can have any convenient shape and material of construction that is resistant to attack by the contents of the vessel and allows the contents to be seen, including glass, transparent coatings, flexible plastic, rigid plastic, and wax paper.

A hemispherical clear plastic bubble holding about 0.2 ml of liquid is a particularly suitable embodiment of the vessel according to the invention.

Water can become a component of the time release mechanism of the invention as water vapor, such as environmental moisture, or as liquid water. The time release mechanism can also be run “dry”, that is using atmospheric water to activate the system. There need not be any apparent water visible. A drop or about 0.01 ml is sufficient. A drop is about 1/20 of a ml. When water vapor is the last component to enter the time release mechanism, it can be taken up as water of crystallization by an anhydrous solid neutralizer, and thereby delay the start of the interval being marked until the hydration capacity of the neutralizer is satisfied. Thus, the hydration capacity of trisodium phosphate, for example, is twelve moles of water per mole of trisodium phosphate.

A further way of regulating the access of water vapor and accelerating its access when desired is provided by the optional inclusion with the composition of a humectant such as glycerol or sorbitol.

Water can also become the first, the last, or an intermediate component of the time release mechanism in liquid form.

Any neutralizer able to increase the pH of the material to which it is added above 7.0 can be used. The neutralizer can be inorganic or organic. Inorganic neutralizers include ammonia, borax, calcium hydroxide, dipotassium hydrogen phosphate, disodium hydrogen phosphate, milk of magnesia, lime water, potassium bicarbonate, potassium carbonate, potassium hydroxide, potassium silicate, sodium acetate, sodium bicarbonate, sodium carbonate, sodium hydroxide, sodium silicate, tetrapotassium pyrophosphate, tetrasodium pyrophosphate, tripotassium phosphate, trisodium phosphate, and mixtures thereof.

Organic neutralizers include N-(2-aminoethyl)ethanolamine, 2-amino-1-propanol, diethanolamine, diisopropanolamine, monoethanolamine, monoisopropanolamine, morpholine, piperazine, triethanolamine, triethylamine, triisopropanolamine, tris(hydroxymethyl)aminomethane, and mixtures thereof.

In a preferred embodiment, there can be used a combination of neutralizers to maintain a desired pH level and resist undesired changes in pH. Many such combinations or so-called buffer systems are known to the art, and frequently commercially available. Thus, 50 ml of 0.1 molar tris(hydroxymethyl)aminomethane can be combined with quantities of 0.1 molar hydrochloric acid in the range from 5.7 ml to establish and maintain pH 9.0 to 42 ml for pH 7.4. Similarly, various combinations of disodium hydrogen phosphate and sodium hydroxide can establish and maintain pH in the range from 10.9 to 12.0. There are also known buffer systems capable of establishing any desired pH in the range from 7.2 to 8.5, in the range from 8.4 to 9.7, in the range from 9.6 to 10.9, in the range from 10.7 to 12.0, and in the range from 11.7 to 13.2.

Hydroquinone, (1,4-benzenediol) can be considered a preferred representative of a class of hydroquinone compounds, i.e. diphenol compounds preferably having 6 to 14 carbon atoms and two phenolic hydroxyl groups of which two are in ortho or para-, i.e. 1,2 or 1,4-orientation to each other. Other suitable phenols of this class include 2-methyl-1,4-dihydroxybenzene, 2,5-dimethyl-1,4-dihydroxybenzene, 2,6-dimethyl-1,4-dihydroxybenzene, 2,3,5-trimethyl-1,4-dihydroxybenzene, 2-ethyl-1,4-dihydroxybenzene, 2-t-butyl-1,4-dihyroxybenzene, 2,5-di-t-butyl-1,4-dihydroxybenzene, 1,4-dihydroxynaphthalene, and 2-methyl-1,4-dihydroxynaphthalene.

The source of oxygen according to the invention is usually and preferably an oxygen-containing gas such as air, pure oxygen, ozone, or oxygen diluted as convenient with a non-reactive gas such as nitrogen. Liquid and solid sources of oxygen such as hydrogen peroxide, water-soluble organic peroxides such as t-butyl hydroperoxide, urea peroxide, and sodium carbonate peroxide (i.e. sodium carbonate with hydrogen peroxide of crystallization) can also be used, with the precaution of causing the hydroquinone compound component to be the last item to be brought into the presence of the others at the start of the interval to be marked.

When the source of oxygen is the last component to complete the time release mechanism of the invention, contact of oxygen with the other components is prevented until the interval intended to be marked is to begin. At that time, a liquid source of oxygen, such as hydrogen peroxide, can be injected into the vessel, suitably by a hypodermic syringe, or access of oxygen gas to the vessel can be initiated by breaking, cutting, puncturing, ripping, tearing, or otherwise undoing the closure or seal that kept the other components away from a source of oxygen.

Modest concentrations of each component are adequate to the operation of the time release mechanism of the invention. The concentrations of a hydroquinone compound and neutralizer are each preferably in the range from 0.001 to 1.0 molar, more preferably in the range from 0.003 to 0.3 molar. The hydroquinone compound can be fully dissolved, partially dissolved (that is a combination of solid and dissolved), or entirely solid.

The relative molar proportions of the hydroquinone compound and neutralizer can range from 10 to 1 to 1 to 19 but are preferably approximately equimolar.

A further preferred embodiment of the new expiration date system of the present invention is a pre-manufactured expiration date label capable, through various methods, of alerting the consumer to the expiration date of the corresponding perishable product. The label or tag is activated once affixed directly onto the relevant perishable product or its packaging. In some embodiments, the system will require further action by the consumer to begin activation, e.g., by removing an outer protective layer, which then exposes the remainder of the system to environmental conditions.

As described in further detail below, and as shown in FIG. 3, one of the methods by which the expiration system of the present invention can be activated by the consumer or the manufacturer includes the step of peeling the outer protective layer 40 or pulling a pre-determined tear from a conventional label serving as a protective layer, thereby activating by exposure to the atmosphere, a chemical substance or combination of substances contained within the label. The chemical substance is formulated to measure the useful life span of a specific perishable product and to provide an indicator to the consumer upon the expiration date of the product. The indicator may be a written message, a change in color, or a change from opaqueness to transparency or the reverse.

Another embodiment of the present invention includes an indicator in the form of a bar strip which may be activated by the consumer or the manufacturer by removing a protective layer and exposing the bar strip indicator to the atmosphere. The strip is treated with the time release mechanism of the invention preformulated to measure the useful life span of the specific product. Once activated, the strip will provide a progressive visual indicator as a function of time corresponding to the useful life span of the perishable product. A notice accompanying the bar strip will instruct the consumer that the progressive change occurring along the strip demarcates the time remaining in the useful life span of the product. As with the other embodiments of the present invention, the bar strip chemical compound may provide an indicator by progressively turning a designated color, darkening, becoming transparent or opaque, depending upon the chemical used and/or the application thereof. In addition, the system may also function by use of a chemical substance or ink pre-formulated to provide an indicator according to the useful life span of the specific product. The chemical substance, like ink, may be applied directly to the product or its packaging by conventional printing methods.

As shown in FIG. 1, one embodiment of the present invention takes into account "double expiration dates" for sealed products whose expiration date begins to toll once the product is opened by the consumer since most consumers will seldom record the date on which the product was opened. This embodiment of the new expiration date system (NEDS) 14 of the present invention can be adapted for perishable products having double expiration dates whereby the label 14 is fixed onto the product packaging 10 in the manner of a tamper proof seal such that when the seal is broken by the consumer the time release chemical component of the label is activated. The secondary expiration label is activated by breaking a protective foil or membrane as shown in FIG. 1, and described in further detail below. Another embodiment of the NEDS is shown in FIG. 2, as described below in relationship to that figure, except that the NEDS embodiment does not include the dissolvable gel or layer of detectors described below.

For products having a double expiration date, the system of the present invention may provide an expiration indicator for both the sealed retail shelf life as well the second expiration date which tolls after the breaking of the sealed micro environment or packaging.

Another embodiment of the present invention is formed of an expiration date system customized to detect and take into account predetermined variables and thus provide a customized new expiration date system (CNEDS). The CNEDS embodiment will take into account that for some perishables, the expiration date may be accelerated if the product is subjected to extreme temperatures, sunlight or other harsh external conditions. For example, milk spoils at a faster rate if not refrigerated versus being refrigerated. The present invention is meant to take this into account and provide the consumer with information regarding product spoilage under these circumstances.

Figure 2:
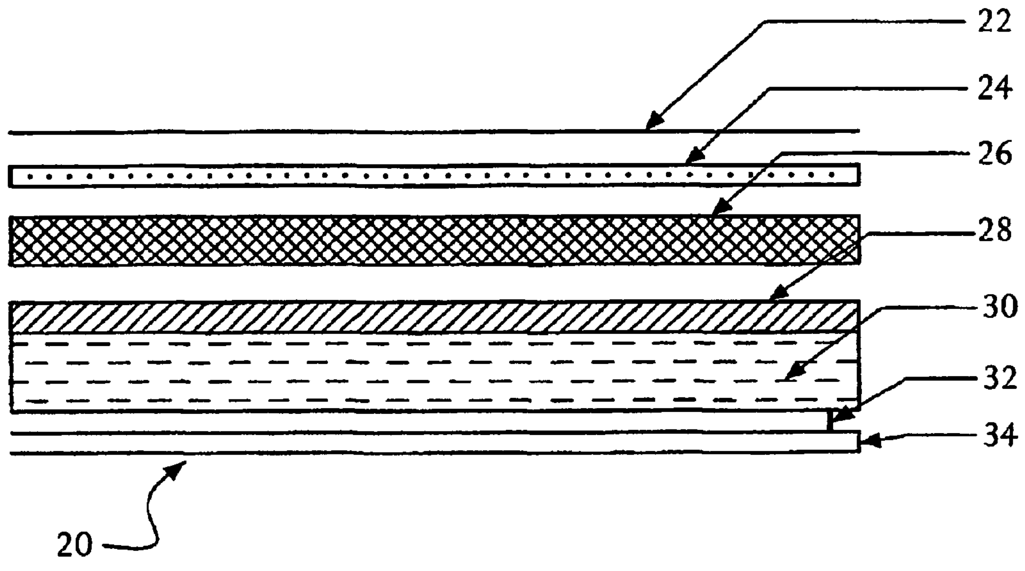
FIG. 2 is a diagrammatic, side sectional view of a first embodiment of the expiration date system.

As shown in FIG. 2, another embodiment of the present invention addresses the problem of external variables that cannot be reliably predicted so as to create a customized system. In such instances, the self-contained new expiration date system of the present invention (SCNEDS) may be implemented which will degrade at a constant, predetermined rate independent of external factors. The self-contained new expiration date system of the present invention is activated by removing a protective layer or foil, thereby exposing a layer of dissolvable gel. Once the gel layer dissolves, chemical indicators located within the expiration date system will trigger the indicator or chemical compound, which will begin to degrade at a constant rate.

The chemical component provides an indicator to the consumer by various means such as a change of color, darkening or becoming colorless or clear.

In one embodiment of the time release mechanism, the composition in the vessel is gelled; the last chemical component of the indicator composition can then be introduced in a pattern localized on part of the gelled surface as desired, to provide a pictorial or verbal warning message to the consumer such as the international circle and slash symbol or the words "product has expired."

Any water-soluble gelling agent effective at pH greater than 7.0 can be used. Particularly suitable gelling agents include agar, carrageenan, gum tragacanth, hydroxyethyl cellulose, hydroxypropyl methylcellulose, poly(ethylene oxides), poly(ethylene glycols), poly(methylene glycols), poly(methylene oxides), poly(vinyl alcohols), sodium carboxymethyl cellulose, and polymerized acrylic acid and alkali metal salts thereof. An extensive disclosure of polymerized acrylic acid and alkali metal salts thereof in U.S. Pat. No. 6,083,422 to Ambuter et al. is here incorporated by reference herein. A homopolymer of acrylic acid crosslinked with allyl ether of pentaerythritol is commercially available under the name CARBOMER, CAS Registry no. 9003-01-4. The concentration of gelling agent when used is suitably in the range from 0.01% by weight to 10% by weight, preferably in the range from 0.2% by weight to 2% by weight.

Example 1

A series of flasks is prepared. Each flask is fitted with connections to vacuum, to a dropping funnel, to a source of nitrogen, and to the atmosphere. Each flask is charged with 10 ml of a buffer solution to establish and maintain a pH as tabulated below, evacuated to 20 torr, repressured with nitrogen, evacuated again, supplied with 3 ml of 0.1 molar aqueous hydroquinone solution, and finally opened to the atmosphere. The samples are stored at 76° F., and observed at least once daily until a change from colorless to brown is noted.

| Sample | pH |
|---|---|
| A | 6.6 |
| B | 7.7 |
| C | 8.8 |
| D | 9.9 |
| E | 11.0 |
| F | 12.1 |

Color changes are observed in the order F before E, E before D, D before C, and C before B. Sample A has not changed color by the end of the observation period. The results show the usefulness of systems of the invention having pH greater than 7 to mark the interval from assembly of all components to visible change.

Example 2

Quantities of samples A-F are obtained as in Example 1 and stored in a refrigerator at 41° F. Color changes are noted at greater intervals and in the same order as in Example 1.

Examples 3-5

Time release mechanisms according to the invention in which the components are gelled by including a gelling agent are formulated as follows, all parts being by weight:

| | EXAMPLE | | |
|---|---|---|---|
| | 3 | 4 | 5 |
| Water | 69.0 | 98.6 | 74.7 |
| Carbopol ® EZ-2 acrylic acid polymer | 0.4 | 0.3 | 1.8 |
| Morpholine | 2.0 | none | none |
| Non-ionic surfactant | 2.0 | 0.2 | none |
| Oleic acid | 2.0 | none | none |
| Hydroquinone | 0.5 | 0.5 | 0.3 |
| Mineral Spirits | 23.2 | none | none |
| Triethanolamine | none | 0.4 | none |
| Sodium hydroxide | none | none | 12.3 |
| Sodium gluconate | none | none | 11.2 |
| Appearance | white gel | white gel | translucent |
| PH | 8.5 | 7.6 | 12.8 |

The present invention can be adapted for use with each of these systems by varying the quantity and concentration of the chemical compound used, by mixing the chemical compounds of the present invention with a gelatin substance at different concentrations.

As shown in FIG. 2, one embodiment 20 of the new expiration date system of the present invention (SCNEDS) includes an exterior protective layer 22 made of conventional metallic foil, polymeric coatings, or other similar protective materials that the consumer may remove to activate the chemical component in accordance with the present invention.

Below the exterior protective layer 22, is a protective membrane 24, which may be a clear or opaque plastic cover that is also porous and allows for light and/or oxygen to activate the chemical component 26 as well as to keep the chemical component 26 as previously described, in place.

In the Self-Contained New Expiration Date System (SCNEDS) embodiment of the present invention shown in FIG. 2, that embodiment includes a dissolvable gel 28 and a layer of detectors 30. The dissolvable gel 28 is made from water dissolvable polymers as shown above.

The embodiment 20, of FIG. 2, also includes a conventional plastic backing 32 to provide support for the other components of the expiration date system of the present invention. The plastic backing 32 may be secured in a removable or more permanent fashion by use of one or more conventional adhesives 34 to secure the device 20 to a conventional container in accordance with the present invention.

Without further elaboration, the foregoing specification provides exemplary use of the invention and is not meant to limit the invention in any manner, and maybe adapted for use in accordance with various uses in manners known to those skilled in the art.

I claim:

1. A system for indicating an end of a predetermined interval of time in a range from two days to two years, the system comprising:

a vessel, said vessel having the following components added, in any order, said components being i) water, ii) a neutralizer, iii) a source of oxygen, and iv) a hydroquinone compound, wherein a combination of said components imparts a pH greater than 7.0;

a start time for the predetermined interval of time begins when all of said components are combined in said vessel; and an end time for said predetermined interval of time is indicated by a visual indicator, said end time is a variable time period being an adjustable function of pH and temperature.

2. The system of claim 1, wherein said predetermined interval is in a range from two days to one month.

3. The system of claim 1, wherein said predetermined interval is in a range from one month to a year.

4. The system of claim 1, wherein the pH is in a range from 8 to 12.

5. The system of claim 1, wherein said hydroquinone compound is hydroquinone.

6. The system of claim 1, wherein said neutralizer is a buffer.

7. The system of claim 1, wherein said source of oxygen is air.

8. The system of claim 1, further comprising a protective layer.

9. The system of claim 8, wherein said predetermined interval to be marked is initiated by removing said protective layer.

10. The system of claim 1, wherein information provided to a consumer regarding an end of said predetermined interval is in a form of a printed message.

11. The system of claim 1, wherein information provided to a consumer regarding an end of said predetermined interval is in a form of a change in color.

12. The system of claim 1, wherein said vessel is a bar strip whereby a visually apparent progressive change occurring along said bar strip demarcates time remaining to an end of said predetermined interval.

13. A container for a perishable product, comprising:

a container body; and the system according to claim 1, wherein a time interval is measured based on the start time correlating to the combination of said components and the end time correlating to a visual indicator based on said combination.

14. The container according to claim 13, further comprising a seal sealing said container body and forming a sealed micro environment or packaging, said system marking a first time interval for both a sealed retail shelf life of the perishable product and a second interval tolling after a breaking of said sealed micro environment or said packaging.

15. A method for measuring a time interval comprising:

selecting a desired time interval;

selecting a pH greater than 7.0;

providing components of water, a neutralizer, a source of oxygen, and a hydroquinone compound to impart the pH selected when combined;

providing a vessel, with a visual indicator, to combine the components;

combining the components in the vessel, wherein the combination of the components correlates to a starting time point for measuring the time interval; and observing the visual indicator, wherein the visual indicator is a result of a reaction from the combining of the components and the visual indicator indicates an end point of the time interval.

* * * * *